US012392626B2

(12) United States Patent
Buttolo et al.

(10) Patent No.: US 12,392,626 B2
(45) Date of Patent: Aug. 19, 2025

(54) SYSTEMS AND METHODS FOR GUIDING A VISUALLY IMPAIRED PASSENGER USING RIDESHARE SERVICES

(71) Applicant: Ford Global Technologies, LLC, Dearborn, MI (US)

(72) Inventors: Pietro Buttolo, Dearborn Heights, MI (US); Cynthia M. Neubecker, Westland, MI (US); Ranjani Rangarajan, Farmington Hills, MI (US); Graham Smith, Dearborn, MI (US)

( * ) Notice: Subject to any disclaimer, the term of this patent is extended or adjusted under 35 U.S.C. 154(b) by 159 days.

(21) Appl. No.: 17/659,835

(22) Filed: Apr. 19, 2022

(65) Prior Publication Data

US 2023/0332912 A1  Oct. 19, 2023

(51) Int. Cl.
| | |
|---|---|
| *G01C 21/36* | (2006.01) |
| *G01C 21/34* | (2006.01) |
| *G06V 20/58* | (2022.01) |
| *G06V 40/10* | (2022.01) |
| *G09B 21/00* | (2006.01) |
| *H04R 1/10* | (2006.01) |

(52) U.S. Cl.
CPC ..... *G01C 21/3629* (2013.01); *G01C 21/3461* (2013.01); *G01C 21/3484* (2013.01); *G06V 20/58* (2022.01); *G06V 40/10* (2022.01); *G09B 21/006* (2013.01); *H04R 1/1041* (2013.01); *H04R 2420/07* (2013.01)

(58) Field of Classification Search
CPC .... G06V 40/10; G06V 20/58; G01C 21/3629; G01C 21/3461; G01C 21/3484; H04R 2420/07; H04R 1/1041; G09B 21/006
See application file for complete search history.

(56) References Cited

U.S. PATENT DOCUMENTS

| | | | |
|---|---|---|---|
| 9,421,909 B2 | 8/2016 | Strickland et al. | |
| 9,881,503 B1 | 1/2018 | Goldman-Shenhar et al. | |
| 10,720,059 B2 | 7/2020 | Bartel | |
| 11,753,040 B1 * | 9/2023 | Gammelgard | G05D 1/0016 |
| | | | 701/2 |
| 2014/0309806 A1 | 10/2014 | Ricci | |

(Continued)

OTHER PUBLICATIONS

Mojibur Rahman Redoy Md Akanda et al., Voice-Controlled Smart Assistant and Real-Time Vehicle Detection for Blind People, Sep. 8, 2020.

*Primary Examiner* — Andrea C Leggett
(74) *Attorney, Agent, or Firm* — Emily Drake; Eversheds Sutherland (US) LLP (57) ABSTRACT

Systems and methods for assisting visually impaired passengers, e.g., blind passengers, using rideshare services is provided. The system may identify a visually impaired passenger from image data captured by one or more exterior cameras of a rideshare vehicle, e.g., by detection of use of a cane by the passenger. The system may then generate audible instructions that may be emitted via exterior and interior speakers of the vehicle or via a wirelessly paired headset worn by the passenger, to guide the passenger to the vehicle entrance and to an available passenger seat within the vehicle. The system further may detect obstacles or features in the path of the passenger, and emit audible alerts to guide the passenger around the obstacle or feature.

20 Claims, 4 Drawing Sheets

(56) References Cited

U.S. PATENT DOCUMENTS

| | | | |
|---|---|---|---|
| 2015/0015024 A1* | 1/2015 | Cremers | G09B 21/008 |
| | | | 296/178 |
| 2018/0137103 A1* | 5/2018 | Watson | G09B 21/006 |
| 2019/0224049 A1* | 7/2019 | Creasy | G01C 21/3644 |
| 2020/0312063 A1* | 10/2020 | Balakrishnan | G07C 5/008 |
| 2020/0406814 A1* | 12/2020 | Cunningham, III | B60R 1/00 |
| 2021/0125110 A1* | 4/2021 | Yamazaki | G06N 20/00 |
| 2021/0179148 A1 | 6/2021 | Kim et al. | |
| 2022/0089170 A1* | 3/2022 | Hu | B60W 60/0053 |
| 2022/0185113 A1* | 6/2022 | Nix | B60K 35/00 |
| 2022/0234499 A1* | 7/2022 | Shmueli Friedland | |
| | | | G10K 15/02 |
| 2022/0410802 A1* | 12/2022 | Aladas | B60W 50/16 |
| 2023/0039479 A1* | 2/2023 | MacIntosh | H04W 4/024 |
| 2023/0053019 A1* | 2/2023 | Webb | G07C 9/00309 |
| 2023/0067615 A1* | 3/2023 | Bond | G06V 10/768 |
| 2023/0073442 A1* | 3/2023 | Preiss | G07C 5/0808 |
| 2023/0075782 A1* | 3/2023 | Co | A61B 5/7264 |
| 2023/0173979 A1* | 6/2023 | Hagelis | B60Q 9/00 |
| | | | 340/905 |
| 2023/0305576 A1* | 9/2023 | Chase | G08G 1/0145 |
| | | | 701/2 |
| 2023/0343208 A1* | 10/2023 | Ueno | A61H 3/06 |

* cited by examiner

SYSTEMS AND METHODS FOR GUIDING A VISUALLY IMPAIRED PASSENGER USING RIDESHARE SERVICES

BACKGROUND

Public transit has a critical role in the independence of blind travelers, as blind persons who use public transportation have more opportunities for employment, education, leisure, and socialization. However, blind travelers face difficulties with the use of public transportation, despite accessibility advances promoted by the American with Disability Act (ADA) or similar legislation.

In 2017, WHO's statistics showed that 253 million people are visually impaired worldwide. These individuals face physiological, psychological, social, and economic challenges that affect their quality of life and deprive them from performing many activities of daily living independently, such as independent mobility.

There exists a need for a solution to coach and inform a visually impaired traveler in how to ingress and egress a vehicle, as well as free space information related to seating options within the vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Disclosed are systems and methods for assisting visually impaired passengers, e.g., blind passengers, using rideshare services. A method for assisting the visually impaired passenger as they approach the vehicle includes the following. First, the visually impaired passenger approaches the vehicle. An artificial intelligence (AI) algorithm is used to identify the passenger as a potential visually impaired person based on image data captured by vehicle cameras, e.g., based on cane usage. The vehicle may greet the passenger using an external speaker. If the camera identifies that the passenger is wearing a compatible headset, it will offer a simplified pairing process, e.g., requiring the passenger to only press a button on the headset, so that the visually impaired person can receive communications privately. To confirm that the pairing was with correct passenger, the vehicle may use the private audio channel with the headset to request the passenger to perform a gesture, e.g., a hand motion that may be analyzed and matched by the vehicle cameras.

Next, directional information will be provided to the passenger via the audio channel (either the vehicle's external speaker or the passenger headset, or both), describing the distance and orientation of the ingress point to the vehicle. Additional information about the presence and number of steps, if any, also may be provided. If the external speaker is used (and adjacent to the entrance of the vehicle), it may also emit a periodic chime in the background, meant to improve the visually impaired person's ability to locate the ingress point. Alternatively, if the passenger headset is used, the sound may be modulated in stereo to provide an indication of relative location relative to the ingress point to the vehicle. Moreover, the pitch of the chime may be used to indicate the relative orientation of the passenger to the vehicle door, as observed by the camera. The chime period also may be modulated to indicate the passenger's distance to the entrance door, e.g., the closer to the door, the faster the chime. An alternative to feedback relative orientation is through panning to the different left and right channels. Additionally, distance may be indicated in a way mimicking how sound travels through air. For example, as sound travels through air, high-frequencies are attenuated. This may be mimicked via a low-pass filter where the cut-off frequency correlates to the distance.

The external camera may monitor the walking cane used by the visually impaired person. Alternatively, in absence of a cane, the external camera may monitor the location and orientation of the passenger's leading foot. Moreover, an AI and/or machine learning algorithm may determine the presence of obstacles or features on the path of the passenger, and provide audio feedback describing the obstacle, e.g., pertinent to obstacle nature, distance, and/or height. In some embodiments, the visually impaired passenger may to use their hand or cane to point around their person, as the vehicle camera processes and describes what they are looking at as they approach the vehicle.

A method for assisting the visually impaired person while they are already in the vehicle includes the following. As the visually impaired passenger enters the vehicle, a communication, e.g., via a mobile application on their personal device, will confirm their ride. If a seat reservation was not made, the vehicle's interior cameras scans the interior of the vehicle for the easiest accessible seat that is unoccupied and not reserved. The vehicle's audio system will communicate the seat location to the passenger, e.g., by describing its location relative to the passenger: "Turn to the right to align with aisle, your seat is three rows from here, to the right." The audible communication may occur through a vehicle main speaker, e.g., placed at the entrance of the vehicle, or, if the passenger is wearing a paired headset, through the private channel with the headset. An additional speaker located at the target seat may emit an audible communication, e.g., start pinging, to help the passenger navigate to it. As with the vehicle's external speaker, the pitch and/or frequency of the chime emitted by the interior speaker at the target seat may be varied to notify the passenger of their relative alignment and distance from the seat.

Additional speakers located on other seats may issue a chime if the vehicle's interior cameras detect that the passenger's predicted motion would lead to a collision. The passenger's headset, if equipped, and/or the main vehicle speaker may provide a real-time description of any obstacles or features the passenger is approaching as they travel along the aisle, e.g., other passenger bags/belonging, steps on the floor, etc. Sound localization methods may be used to ensure the audio is only transmitted to the visually impaired passenger to minimize disturbances to the other vehicle passengers. This may include, for example, technologies such as spatial equalization or ultrasonic techniques.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
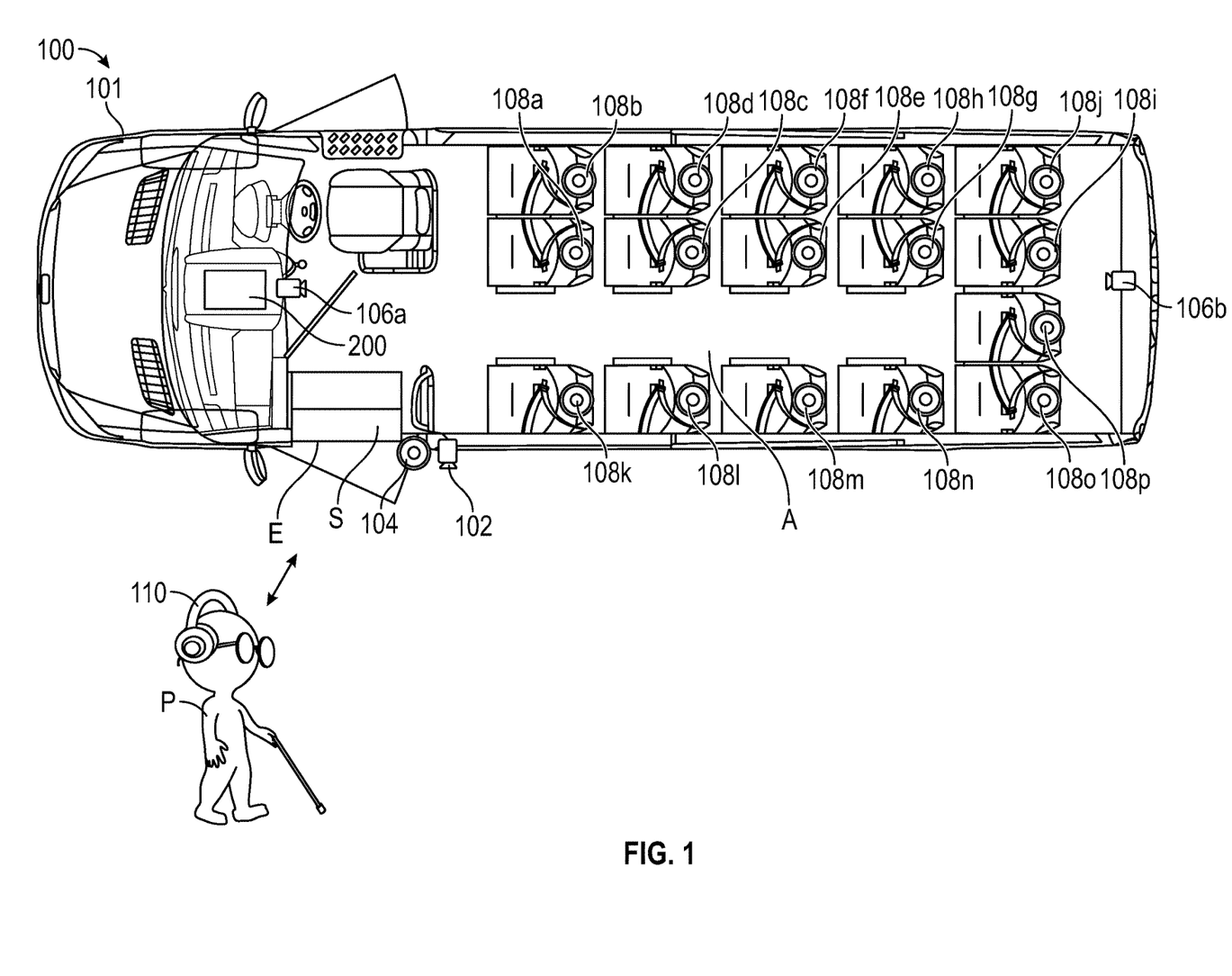
FIG. 1 illustrates a system for guiding a visually impaired passenger to a vehicle in accordance with the principles of the present disclosure.

Referring now to FIG. 1, an exemplary system for guiding a visually impaired passenger to a vehicle is provided. As shown in FIG. 1, system 100 may include vehicle 101, e.g., a ride share vehicle, and optional headset 110, all communicatively coupled to guidance platform 200 over a network, e.g., any one, or a combination of networks, such as a local area network (LAN), a wide area network (WAN), a telephone network, a cellular network, a cable network, a wireless network, and/or private/public networks, such as the Internet. For example, the network may support communication technologies, such as TCP/IP, Bluetooth, cellular, near-field communication (NFC), Wi-Fi, Wi-Fi direct, machine-to-machine communication, man-to-machine communication, and/or a vehicle-to-everything (V2X) communication.

For example, guidance platform 200 may be paired with headset 110 via a wireless Bluetooth connection using a simplified pairing process where, upon detection of headset 110 by guidance platform 200, a connection request is sent from guidance platform 200 to headset 110, such that passenger P may accept the request via a single actuation, e.g., pressing a button either on headset 110 or via an application on a mobile device associated with headset 110. Guidance platform 200 may be located on one or more remote servers, e.g., on a cloud server, and/or embedded in the vehicle control system of vehicle 101.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies, e.g., adaptive cruise control. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system event. Level-5 autonomy is associated with autonomous vehicle systems that require no human input for operation, and generally do not include human operational driving controls. According to embodiments of the present disclosure, guidance platform 200 may be configured and/or programmed to operate with a vehicle having a Level-4 or Level-5 autonomous vehicle controller.

As shown in FIG. 1, vehicle 101 has entrance E and one or more passenger seats, and may include one or more exterior sensors, e.g., camera 102, one or more exterior speakers, e.g., speaker 104, one or more interior sensors, e.g., cameras 106*a* and 106*b*, and one or more interior speakers, e.g., speakers 108*a*, 108*b*, 108*c*, 108*d*, 108*e*, 108*f*, 108*g*, 108*h*, 108*i*, 108*j*, 108*k*, 108*l*, 108*m*, 108*n*, 108*o*, and 108*p*. For example, camera 106*a* may be positioned within vehicle 101 toward the front end of vehicle 101 such that camera 106*a* has a field of view of the rear of vehicle 101, and camera 106*b* may be positioned within vehicle 101 toward the rear end of vehicle 101 such that camera 106*b* has a field of view of the front of vehicle 101. The exterior and interior cameras may perceive and capture image data indicative of passenger P, as well as obstacles that may be in the path between passenger P and vehicle 101 and an available passenger seat, and other passengers within vehicle 101.

Moreover, speakers 108*a-p* may be each be disposed on a respective passenger seat, and configured to be selectively activated. As will be understood by a person having ordinary skill in the art, vehicle 101 may have less or more than 16 passenger seats as shown in FIG. 1, and accordingly, vehicle 101 may include a corresponding number of passenger seat speakers. In some embodiments, the number of interior speakers do not need to correspond with the number of passenger seats. For example, there may be one speaker per row of passenger seats, and/or additional interior speakers distributed throughout the interior of vehicle 101. Additionally, in some embodiments, vehicle 101 may include steps S, e.g., adjacent to entrance E, and/or aisle A extending through the interior of vehicle 101, providing access to each passenger seat.

Figure 2:
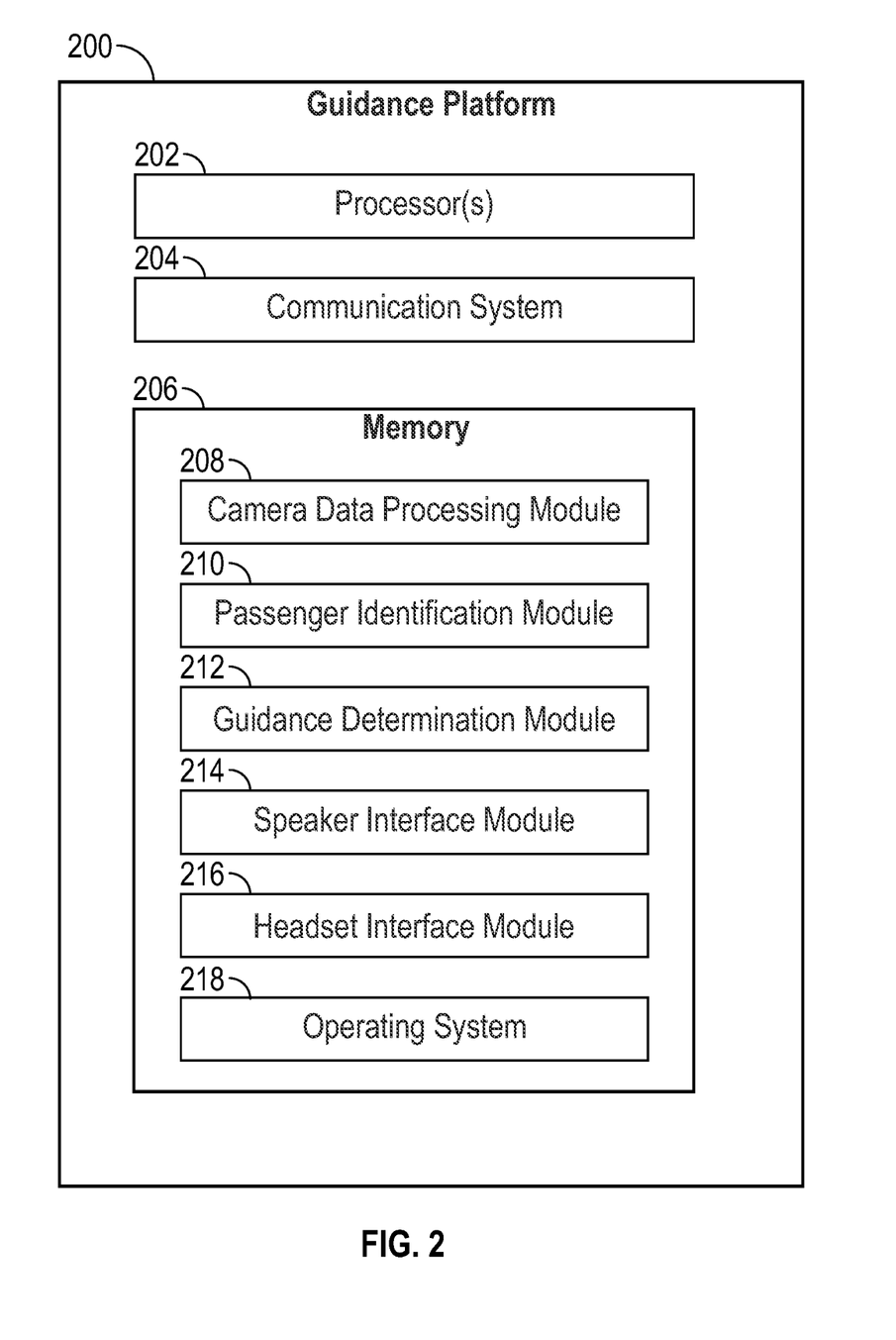
FIG. 2 shows some example components that may be included in a guidance platform in accordance with the principles of the present disclosure.

Referring now to FIG. 2, components that may be included in guidance platform 200 are described in further detail. Guidance platform 200 may include one or more processors 202, communication system 204, and memory 206. Communication system 204 may include a wireless transceiver that allows guidance platform 200 to communicate with the exterior and interior cameras, the exterior and interior speakers, and with headset 110. The wireless transceiver may use any of various communication formats, such as, for example, an Internet communications format, or a cellular communications format. When guidance platform 200 is embedded with the vehicle control module of vehicle 101, communication system 204 may communicate with the exterior and interior cameras and the exterior and interior speakers via a wired electrical connection.

Memory 206, which is one example of a non-transitory computer-readable medium, may be used to store operating system (OS) 218, camera data processing module 208, passenger identification module 210, guidance determination module 212, speaker interface module 214, and headset interface module 216. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example, but not limited to, an electronic, magnetic, optical, electro-magnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Camera data processing module 208 may be executed by processor 202 for receiving image data from exterior camera 102 and interior cameras 106*a* and 106*b*, and generating one or more signals indicative of the image data for further processing.

Passenger identification module 210 may be executed by processor 202 for analyzing the signals generated by camera data processing module 208 indicative of the image data captures by exterior camera 102. For example, passenger identification module 210 may use an artificial intelligence (AI) algorithm to identify a passenger as potentially being visually impaired based on the image data captured by exterior camera 102. For example, the AI algorithm may be trained to detect behaviors consistent with those of visually impaired travelers, e.g., use of a cane by the passenger and/or foot movement of the passenger.

Guidance determination module 212 may be executed by processor 202 for determining a route for passenger P to follow to guide passenger P to entrance E of vehicle 101 for ingress into vehicle 101. Accordingly, guidance determination module 212 may determine the orientation and location of passenger P relative to entrance E of vehicle 101 based on the image data captured by exterior camera 102, and generate audible instructions to guide passenger P to entrance E of vehicle 101. Additionally, guidance determination module 212 may detect steps S of vehicle 101 based on the image data captured by exterior camera 102 and/or the interior cameras, such that guidance determination module 212 may generate audible instructions to guide passenger P up or down steps S. Alternatively, the presence and location of steps S may be preprogrammed into guidance determination module 212, such that detecting of steps S based on image data is not required.

In addition, guidance determination module 212 may detect if an obstacle or feature is in the path between passenger P and vehicle 101 based on the image data captured by exterior camera 102, and generate audible instructions to guide the passenger around the obstacle or feature to entrance E of vehicle 101. Moreover, guidance determination module 212 may generate an audible description of the detected obstacle or feature, e.g., obstacle nature, distance, and height. In some embodiments, guidance determination module 212 may generate an audible description of specific obstacles or features that guidance determination module 212 detects passenger P is pointing to, based on the image data captured by exterior camera 102. For example, passenger P may point their hand or cane in a direction, which is captured by exterior camera 102, such that guidance determination module 212 may generate an audible description of any objects in that direction.

Moreover, guidance determination module 212 may determine which passenger seat is available and would be the easiest for passenger P to arrive at based on the image data captured by interior cameras 106*a* and 106*b*. For example, guidance determination module 212 may determine that a passenger seat is not available by detecting another passenger in the seat based on the image data captured by the interior cameras. Guidance determination module 212 may determine a route for passenger P to follow to guide passenger P from entrance E of vehicle 101 to an available passenger seat within vehicle 101, e.g., along aisle A, as well as a route from the passenger seat to entrance E for egress from vehicle 101 when passenger P has reached their destination. Accordingly, guidance determination module 212 may determine the orientation and location of passenger P relative to the available passenger seat based on the image data captured by interior cameras 106*a* and 106*b*, and generate audible instructions to guide passenger P to the available passenger seat.

As passenger P travels toward the available passenger seat, guided by the audible instructions, as described in further detail below, guidance determination module 212 may detect if an obstacle, e.g., another passenger's bag, or feature, e.g., another seat within vehicle 101, is in the path between passenger P and the available passenger seat or between passenger P and entrance E, based on the image data captured by the interior cameras, and generate audible instructions to guide passenger P around the detected obstacle or feature and thereby avoid a potential collision.

The audible instructions generated by guidance determination module 212 may be verbal communications, such as when greeting the passenger, guiding the passenger to entrance E and/or to the available passenger seat, and/or when describing the detected obstacle or feature. Additionally, the audible instructions generated by guidance determination module 212 may be audible sounds, e.g., chimes or pinging, with varying pitch and/or frequency depending on the location of the passenger relative to entrance E or to the available passenger seat, to thereby guide the passenger to entrance E or to the available passenger seat. Moreover, the audible instructions may include information regarding which speaker to be emitted from, based on the relative location of the passenger within vehicle 101 and/or the relative position of the detected obstacle or feature, as described in further detail below.

Speaker interface module 214 may be executed by processor 202 for selectively interfacing with the vehicle's speakers, e.g., exterior speaker 104 and interior speakers' 108a-p. Accordingly, speaker interface module 214 may cause a select speaker(s) to emit select audible instructions generated by guidance determination module 212, e.g., based on the detected location of passenger P relative to vehicle 101. For example, upon determination of the available passenger seat to which passenger P is guided to by the audible instructions, the speaker associated with the selected available passenger seat may emit the audible instructions, e.g., ping, and may vary in pitch accordingly, as described above.

Headset interface module 216 may be executed by processor 202 for detecting and interfacing with headset 110 to provide a private channel of communication with passenger P. Headset interface module 216 may detect whether the passenger is wearing a compatible headset, e.g., headset 110, based on the image data captured by exterior camera 102. If headset 110 is detected, guidance platform 200 may be paired with headset 110 via headset interface module 214, e.g., via a simplified pairing process. For example, upon detection of headset 110, either by image data captured by exterior camera 102 or by other wireless means such as Bluetooth detection, headset interface module 216 may generate and wirelessly transmit a connection request to headset 110. Upon acceptance of the connection request by headset 110, either by actuation of a button integrated with headset 110 by passenger P or by actuation of an application running on a mobile device associated with headset 110 by passenger P, headset 110 will be paired with guidance platform 200.

Upon pairing with headset 110, to confirm that the pairing was accomplished with the correct visually impaired passenger, headset interface module 216 may generate audible instructions requiring the passenger to perform a predetermined gesture, e.g., raising of hand, and transmit the audible instructions to headset 110. Accordingly, headset interface module 216 may confirm that the pairing was made with the correct passenger by analyzing the image data captured by exterior camera 102 to detect the predetermined gesture.

Moreover, headset interface module 216 may cause headset 110 to emit the audible instructions generated by guidance determination module 212 to guide passenger P to entrance E of vehicle 101 and to the available passenger seat, while avoid obstacles and features that may be in the way of passenger P. For example, headset 110 may emit verbal instructions such as "Turn to the right to align with aisle, your seat is three rows from here, to the right." In addition, headset interface module 216 may cause headset 110 to emit the audible descriptions of the detected obstacles.

Figure 3:
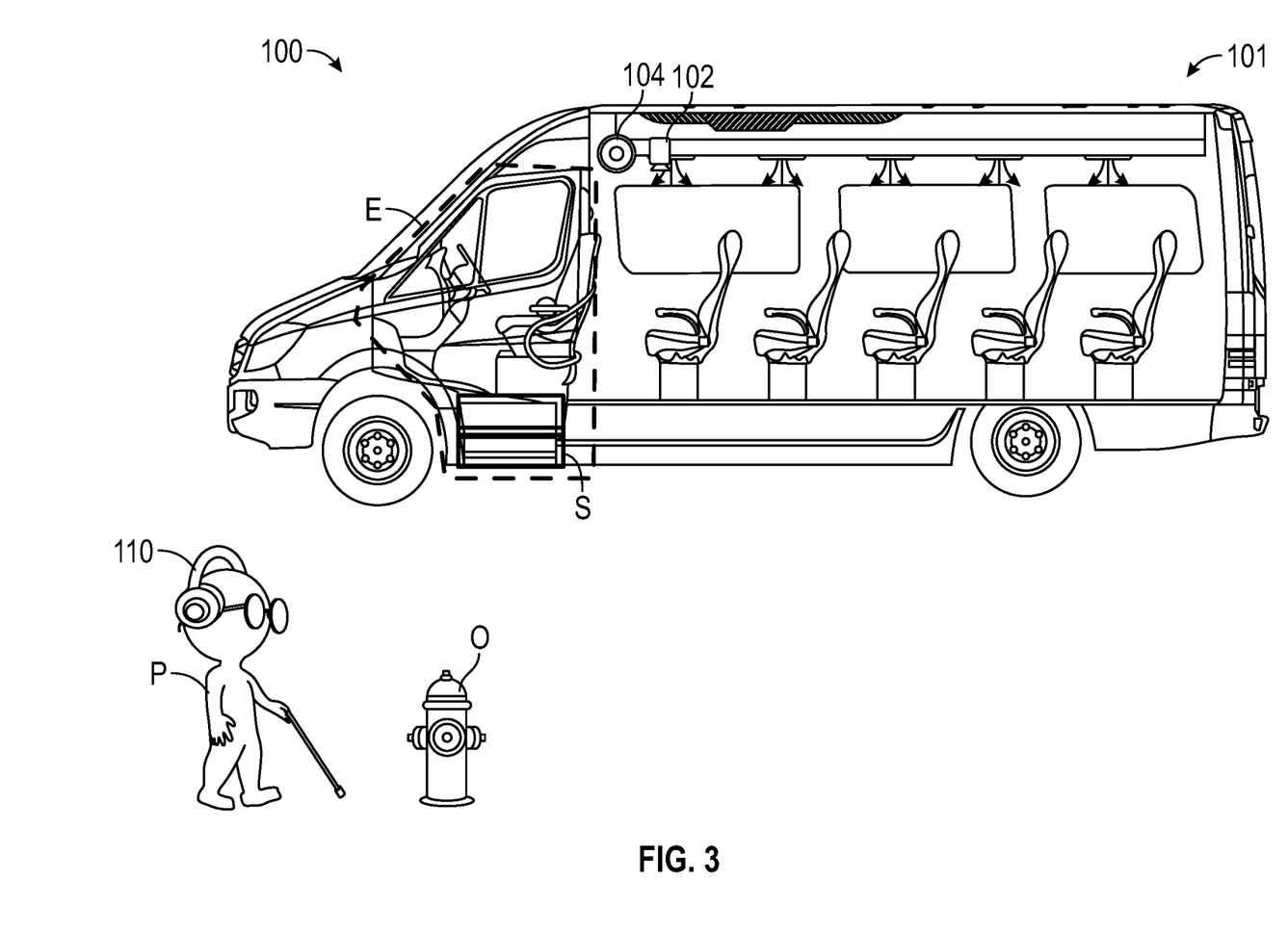
FIG. 3 illustrates guidance of a visually impaired passenger to an entrance of the vehicle using the system of FIG. 1.

Referring now to FIG. 3, guidance of passenger P to entrance E of vehicle 101 using the systems and methods described herein is described. Upon detection of passenger P via the image data captured by camera 102, passenger identification module 210 may identify passenger P as a visually impaired passenger, e.g., by detecting use of a cane. If headset 110 is detected, headset interface module 216 may pair with headset 110 to provide audible guidance to passenger P in a private communication setting. As described above, the pairing may be confirmed by instructing passenger P to perform a predetermined gesture, and detection of the gesture performed.

Accordingly, either via speaker 104 or headset 110, guidance platform 200 may guide passenger P to entrance E of vehicle 101, based on the orientation and location of passenger P relative to entrance E determined by guidance determination module 212. As described above, upon detection of obstacle O based on image data captured by camera 102, speaker 104 or headset 110 may alert passenger P of obstacle O, to thereby guide passenger P around obstacle O. For example, the alert may include an audible description of the nature of obstacle O, as well as its location relative to passenger P, and height. Moreover, as passenger P approaches entrance E, speaker 104 or headset 110 may alert passenger P of steps S at entrance E so that passenger P may be prepared to and travel over steps S for ingress into vehicle 101.

Figure 4:
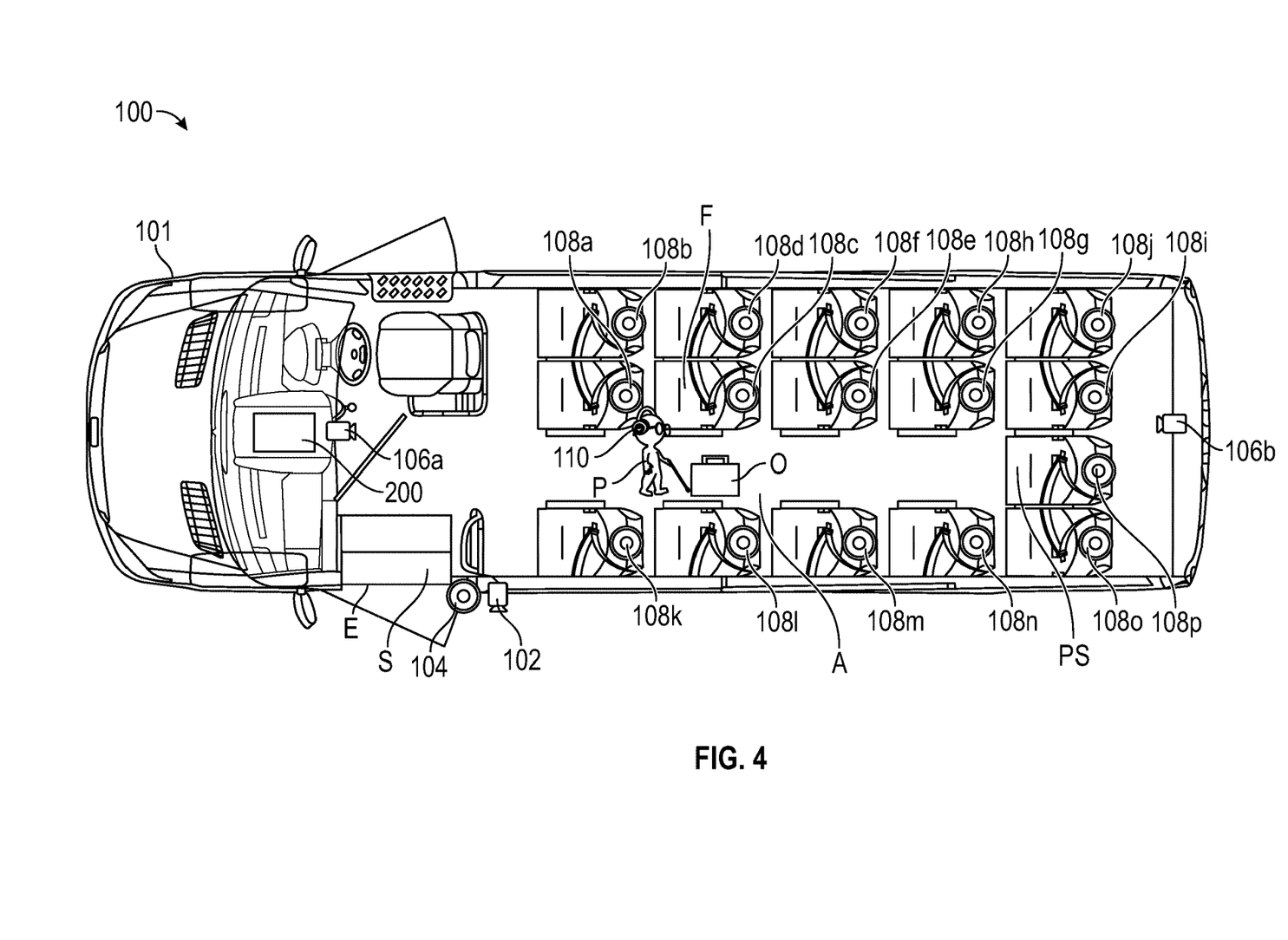
FIG. 4 illustrates guidance of a visually impaired passenger to a seat within the vehicle using the system of FIG. 1.

Referring now to FIG. 4, guidance of passenger P to an available passenger seat vehicle 101 using the systems and methods described herein is described. As shown in FIG. 4, available passenger seat PS may be determined to be the easiest available passenger seat for passenger P to get to within vehicle 101. Accordingly, guidance determination module 212 may generate audible instruments that are instructed to be emitted from speaker 108p via speaker interface module 214. For example, speaker 108p may begin pinging. Additionally or alternatively, the audible instructions may be verbal instructions emitted via headset 110 to verbally guide passenger P across aisle A to available passenger seat PS. For example, the audible instructions may describe how many rows away passenger seat PS is from passenger P, as determined by image data captured by interior cameras 106a and 106b.

As described above, obstacle O, e.g., another passenger's bag, may be detected in aisle A along passenger P's path to available passenger seat PS, from image data captured by interior cameras 106a and 106b. Accordingly, audible instructions may be emitted via headset 110 to describe obstacle O to passenger P and/or to verbally instruct passenger P regarding how to avoid obstacle O. Additionally or alternatively, speaker 108l adjacent to obstacle O may be instructed to emit an audible alert, to thereby indicate to passenger P the location of obstacle O, such that passenger P may travel around obstacle O.

Moreover, from the image data captured by interior cameras 106a and 106b, passenger P may be predicted to collide with a feature within vehicle 101, e.g., another passenger seat, based on the trajectory and speed of passenger P within vehicle 101. For example, passenger P may be predicted to collide with passenger seat F, and thus, speaker 108c associated with seat F may emit an audible alert to notify passenger P of the location of seat F relative to passenger P, such that passenger P may avoid colliding with seat F. As passenger P approaches available passenger seat PS, speaker 108p may emit the audible alert at, e.g., a higher frequency and/or pitch, to guide passenger P to seat PS.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for guiding a visually impaired passenger to a vehicle, the system comprising:
    a memory that stores computer-executable instructions; and
    a processor configured to access the memory and execute the computer-executable instructions to:

receive data from one or more sensors integrated with the vehicle indicative of a presence of a passenger;

identify the passenger as visually impaired based on the data indicative of the presence of the passenger;

determine a first location of the visually impaired passenger relative to the vehicle based on the data indicative of the presence of the passenger; and cause one or more speakers to emit an audible alert to guide the visually impaired passenger to the vehicle based on the first location of the visually impaired passenger, wherein the audible alert is configured to guide the visually impaired passenger to a door of the vehicle based on the first location of the visually impaired passenger and a second location of the door, wherein the audible alert is further configured to guide the visually impaired passenger to an available seat within the vehicle based on a third location of the visually impaired passenger and a fourth location of the available seat, and wherein the first, second, third, and fourth locations are all different from one another.

2. The system of claim 1, wherein the one or more sensors comprise one or more cameras configured to capture image data indicative of the presence of the passenger, and wherein the processor is further configured to access the memory and execute the computer-executable instructions to:

cause the one or more cameras to monitor a hand of the visually impaired passenger as the visually impaired passenger moves from the first location to the second location, in response to determining that the hand is pointing to a fifth location external with respect to the vehicle, transmit data from the one or more cameras corresponding to a textual description of the fifth location to the one or more speakers, and cause the one or more speakers to audibly recite the textual description.

3. The system of claim 1, wherein the data indicative of the presence of the passenger comprises data indicative of a presence of a cane associated with the passenger, and wherein the processor is configured to identify the passenger as visually impaired based on a predetermined pattern of the cane.

4. The system of claim 1, wherein the data indicative of the presence of the passenger comprises data indicative of a presence of a headset associated with the passenger, such that, upon identification of the passenger as visually impaired, the processor is further configured to communicatively pair with the headset, and wherein, responsive to the processor communicatively pairing with the headset, the processor is configured to cause an audible alert to be emitted on a private audio channel with the headset requesting that the passenger perform a gesture, such that the system can confirm, in response to the passenger performing the gesture, a successful pairing by matching the gesture with data provided by one or more cameras of the vehicle.

5. The system of claim 4, wherein the processor is configured to communicatively pair with the headset over a Bluetooth connection.

6. The system of claim 4, wherein the processor is configured to communicatively pair with the headset automatically.

7. The system of claim 4, wherein the processor is configured to communicatively pair with the headset via a simplified pairing process.

8. The system of claim 7, wherein the simplified pairing process comprises:

transmitting a pairing request to the headset; and initiating the pairing between the processor and the headset responsive to acceptance of the pairing request by the headset.

9. The system of claim 8, wherein acceptance of the pairing request by the headset is accomplished via actuation of an actuator associated with the headset.

10. The system of claim 4, wherein the one or more speakers are integrated with the headset.

11. The system of claim 1, wherein one or more audio parameters of the audible alert are configured to vary based on at least one of orientation of the visually impaired passenger relative to the vehicle or location of the visually impaired passenger relative to the vehicle.

12. The system of claim 11, wherein the one or more audio parameters of the audible alert are configured to vary based on location of the visually impaired passenger relative to an available seat within the vehicle.

13. The system of claim 12, wherein the audio type comprises stereo or analog.

14. The system of claim 11, wherein the one or more audio parameters of the audible alert comprises at least one of audio type, pitch level, or frequency rate of the audible alert.

15. The system of claim 1, wherein the processor is further configured to:

receive data from the one or more sensors indicative of a presence of an obstacle adjacent to the visually impaired passenger; and cause the one or more speakers to emit the audible alert to guide the visually impaired passenger around the obstacle.

16. The system of claim 15, wherein one or more audio parameters of the audible alert are configured to vary based on location of the visually impaired passenger relative to the obstacle.

17. The system of claim 1, wherein the audible alert comprises a periodic chime emitted in a manner wherein a pitch of the periodic chime corresponds to a relative orientation of the visually impaired passenger to the door, as observed by a camera of the vehicle.

18. The system of claim 17, wherein, as the periodic chime is emitted, the periodic chime is modulated based on a first distance of the visually impaired passenger to the door and a second distance of the visually impaired passenger to the available seat, such that as either of the first and second distances decrease, a frequency of the periodic chime increases.

19. A system for guiding a visually impaired passenger to a vehicle, the system comprising:

one or more sensors integrated with the vehicle, the one or more sensors configured to detect a presence of a passenger relative to the vehicle and to generate data indicative of the presence of the passenger;

one or more speakers configured to emit an audible alert;

a memory that stores computer-executable instructions; and a processor configured to access the memory and execute the computer-executable instructions to:

identify the passenger as visually impaired based on the data indicative of the presence of the passenger;

determine a first location of the visually impaired passenger relative to the vehicle based on the data indicative of the presence of the passenger; and cause the one or more speakers to emit the audible alert to guide the visually impaired passenger to the vehicle based on the first location of the visually impaired passenger, wherein the audible alert is configured to guide the visually impaired passenger to a door of the vehicle based on the first location of the visually impaired passenger and a second location of the door, wherein the audible alert is further configured to guide the visually impaired passenger to an available seat within the vehicle based on a third location of the visually impaired passenger and a fourth location of the available seat, and wherein the first, second, third, and fourth locations are all different from one another.

20. A method for guiding a visually impaired passenger to a vehicle, the method comprising:

receiving, by a processor, data from one or more sensors integrated with the vehicle indicative of a presence of a passenger;

identifying, by the processor, the passenger as visually impaired based on the data indicative of the presence of the passenger;

determining, by the processor, a first location of the visually impaired passenger relative to the vehicle based on the data indicative of the presence of the passenger;

causing, by the processor, one or more speakers to emit an audible alert to guide the visually impaired passenger to the vehicle based on the first location of the visually impaired passenger, causing, by the processor, the audible alert to guide the visually impaired passenger to a door of the vehicle based on the first location of the visually impaired passenger and a second location of the door; and causing, by the processor, the audible alert to guide the visually impaired passenger to an available seat within the vehicle based on a third location of the visually impaired passenger and a fourth location of the available seat, wherein the first, second, third, and fourth locations are all different from one another.

* * * * *